United States Patent [19]
Brown et al.

[11] Patent Number: 5,907,634
[45] Date of Patent: May 25, 1999

[54] LARGE VOCABULARY CONNECTED SPEECH RECOGNITION SYSTEM AND METHOD OF LANGUAGE REPRESENTATION USING EVOLUTIONAL GRAMMAR TO REPRESENT CONTEXT FREE GRAMMARS

[75] Inventors: Michael Kenneth Brown, North Plainfield; Stephen Charles Glinski, Edison, both of N.J.

[73] Assignee: AT&T Corp., New York, N.Y.

[21] Appl. No.: 08/846,014

[22] Filed: Apr. 25, 1997

Related U.S. Application Data

[63] Continuation of application No. 08/184,811, Jan. 21, 1994, Pat. No. 5,699,456.

[51] Int. Cl.$^6$ ..................................................... G06K 9/00
[52] U.S. Cl. ............................................ 382/226; 382/228
[58] Field of Search ........................... 704/252; 382/155, 382/156, 173, 181, 185, 186, 187, 188, 189, 190, 192, 195, 199, 201, 202, 203, 209, 217, 224, 226, 227, 228, 229, 230, 231, 232, 254, 266, 270, 191, 193, 194, 196, 197, 205, 210, 215, 216, 218, 220, 271, 272, 273, 172; 395/2.55, 2.5, 2, 2.09, 2.61, 2.42, 2.64, 2.52

[56] References Cited

U.S. PATENT DOCUMENTS

| | | | |
|---|---|---|---|
| 4,713,777 | 12/1987 | Klovstad et al. | 364/513.5 |
| 4,718,088 | 1/1988 | Baker et al. | 381/43 |
| 4,783,803 | 11/1988 | Baker et al. | 381/42 |
| 4,907,278 | 3/1990 | Cecinati et al. | 381/43 |
| 5,202,952 | 4/1993 | Gilick et al. | 395/2 |
| 5,241,619 | 8/1993 | Schwartz et al. | 395/2 |
| 5,287,429 | 2/1994 | Watanbe | 395/2.48 |
| 5,313,527 | 5/1994 | Guberman et al. | 382/13 |
| 5,377,281 | 12/1994 | Ballard et al. | 382/40 |
| 5,384,892 | 1/1995 | Strong | 395/2.92 |
| 5,475,588 | 12/1995 | Shabes et al. | 364/419.08 |

OTHER PUBLICATIONS

R. Moore et al., "Integrating Speech and Natural–Language Processings," *Speech and Natural Language Proceeding of a Workshop*, 1989, pp. 243–247.

H. Ney, "Dynamic Programming Parsing for Context–Free Grammars in Continous Speech Recognition," *IEEE Transactions on Signal Processing*, vol. 39, No. 2, 1991, pp. 336–340.

H. Murveit et al., "Integrating Natural Language Constraints into HMM–based Speech Recognition," *International Conference on Acoustics, Speech and Signal Processing*, 1990, pp. 573–576.

D. Roe et al., "Efficient Grammar Processing for a Spoken Language Translation System," *International Conference on Acoustics, Speech and Signal Processing*, 1992, vol. 1, pp. 213–216.

E. Bocchieri, "Vector Quantization for the Efficient Computation of Continuous Density Likelihoods," *IEEE Int'l. Conf. of Acoustics, Speech and Signal Processing*, 1993, vol. II, pp. 692–695.

C. H. Lee et al., "Acoustic Modeling for Large Vocabulary Speech Recognition," *Computer Speech and Language*, 1990, vol. 4, pp. 127–165.

*Primary Examiner*—Leo H. Boudreau
*Assistant Examiner*—Bijan Tadayon

[57] ABSTRACT

A method of recognizing speech input selectively creates and maintains grammar representations of the speech input in essentially real time. Speech input frames are received by a speech recognition system. Grammar representations are created for each speech frame and a probability score is derived for the representations indicating the probability of the accuracy of the representations to the speech input. Representations having a probability score below a predetermined threshold are not maintained. Those grammar representations having probability scores above the predetermined threshold are maintained. As more speech frames are received by the system, additional grammar representations are created and the probability scores are updated. When the entire speech input has been received, the chain of grammar representations having the highest probability score is identified as the speech input.

5 Claims, 7 Drawing Sheets

LARGE VOCABULARY CONNECTED SPEECH RECOGNITION SYSTEM AND METHOD OF LANGUAGE REPRESENTATION USING EVOLUTIONAL GRAMMAR TO REPRESENT CONTEXT FREE GRAMMARS

This application is a continuation of application Ser. No. 08/184,811, filed on Jan. 21, 1994 now U.S. Pat. No. 5,699,456.

BACKGROUND OF THE INVENTION

The present invention relates generally to methods of recognizing speech and other types of inputs using predefined grammars.

In communication, data processing and similar systems, it is often advantageous to simplify interfacing between system users and processing equipment by means of audio facilities. Speech recognition arrangements are generally adapted to transform an unknown speech input into a sequence of acoustic features. Such features may be based, for example, on a spectral or a linear predictive analysis of the speech input. The sequence of features generated for the speech input is then compared to a set of previously stored acoustic features representative of words contained in a selected grammar. As a result of the comparison, the speech input that most closely matches a (for example) sentence defined by the grammar is identified as that which was spoken.

Connected speech recognition when the grammar is large is particularly complex to implement because of the extensive memory and computation necessary for real-time response by the hardware/software which implements the grammar. Many algorithms have been proposed for reducing this burden, offering trade-offs between accuracy and computer resources. In addition, special purpose hardware is often employed or large grammars are translated into much reduced and less effective forms. While progress has been made in reducing computation requirements through the use of beam searching methods, stack decoder methods and Viterbi algorithms for use with Hidden Markov Models (HMMs), these methods do not fully address the problems of large memory consumption.

One approach taken to reduce the amount of memory and computation needed for large grammars is to construct a word-pair grammar which contains only one instance of each vocabulary word. The reduced grammar only allows for word sequences based on word bigrams which are defined in a full grammar. As a result, invalid sentences can be formed, but each word-to-word transition must exist somewhere in the original grammar as defined by the bigrams. The word-pair grammar results in a much higher error rate than systems which implement a full grammar.

Memory consumption is dictated by the requirements of the search process in the recognition system. The amount of memory and computation required at any instant of time is dependent on the local perplexity of the grammar, the quality of the acoustic features, and the tightness of the so-called pruning function. Grammars such as Context Free Grammars (CFGs) are particularly onerous to deal with because the amount of processing time and memory required to realize accurate recognition is tremendous. Indeed, a CFG with recursive definitions would require infinite HMM representations or finite-state approximations to be fully implemented.

Most prior art methods which perform recognition with CFGs apply a post processing method to the output of a relatively unconstrained recognizer. The post-processor eliminates invalid symbol sequences according to a more restrictive grammar. However, these processors are not capable of processing speech input in essentially real time. In addition, post processing of the grammar tends to be inefficient since the amount of memory consumption may be more than is actually necessary.

SUMMARY OF THE INVENTION

The problems of prior art grammar-based recognition systems are overcome in accordance with the present invention using what we refer to as an evolutional grammar. With this approach, only an initial portion of the grammar is instantiated as the processing begins, the term "instantiation," more particularly, referring to the allocation of memory and other resources needed to implement the portion of the grammar in question. Thereafter, additional portions of the grammar network are instantiated as needed as the input signal processing proceeds.

Moreover, and in accordance with an important aspect of the invention, instantiated portions of the grammar are de-instantiated when circumstances indicate that they are no longer needed, i.e., when it is reasonably clear that a previously instantiated portion of the grammar relates to inputs that have already been received and processed. More particularly, we use the term de-instantiated to mean that, at a minimum, signal processing relating to such portions of the grammar is terminated and that, in preferred embodiments, unneeded portions of the grammar instantiation are completely destroyed by releasing, back to the system, the resources—principally the memory resources—that were allocated to them.

In preferred embodiments, de-instantiation of portions of the network is carried out on a model-by-model basis. Specifically, in the illustrative embodiment. once all of the internal hypothesis scores generated within a particular instantiation of a model, e.g., Hidden Markov Model, have first risen above a predefined threshold and thereafter all drop below it, it can be safely assumed that that portion of the network relates to input that has already been received and processed and it is at that point that the model is de-instantiated. Since the models are instantiated only as needed and are de-instantiated when no longer needed, we refer to them as ephemeral models. Specifically, in embodiments using Hidden Markov Models, we refer to them as Ephemeral Hidden Markov Models (EHMMs).

DETAILED DESCRIPTION

General Description

For clarity of explanation, the illustrative embodiments of the present invention are presented as comprising individual functional blocks. The functions these blocks represent may be provided through the use of either shared or dedicated hardware, including, but not limited to, hardware capable of executing software. Illustrative embodiments may comprise, for example, digital signal processor (DSP) hardware or a workstation executing software which performs the operations discussed below. Very large scale integration (VLSI) hardware embodiments of the present invention, as well as hybrid DSP/VLSI embodiments, may also be provided.

The present invention is directed to a grammar-based connected recognition system that recognizes connected input by instantiating a grammar in real time. In the preferred embodiment, the grammar instantiation is evolved by selectively creating and destroying portions of the grammar instantiation using what we refer to as "ephemeral models" as explained more fully hereinbelow. In the illustrative embodiment, the system is a speaker-independent speech identification system using what we refer to as "ephemeral Hidden Markov Models." However, the invention is equally applicable to other types of identification, such as handwriting identification.

Figure 1:
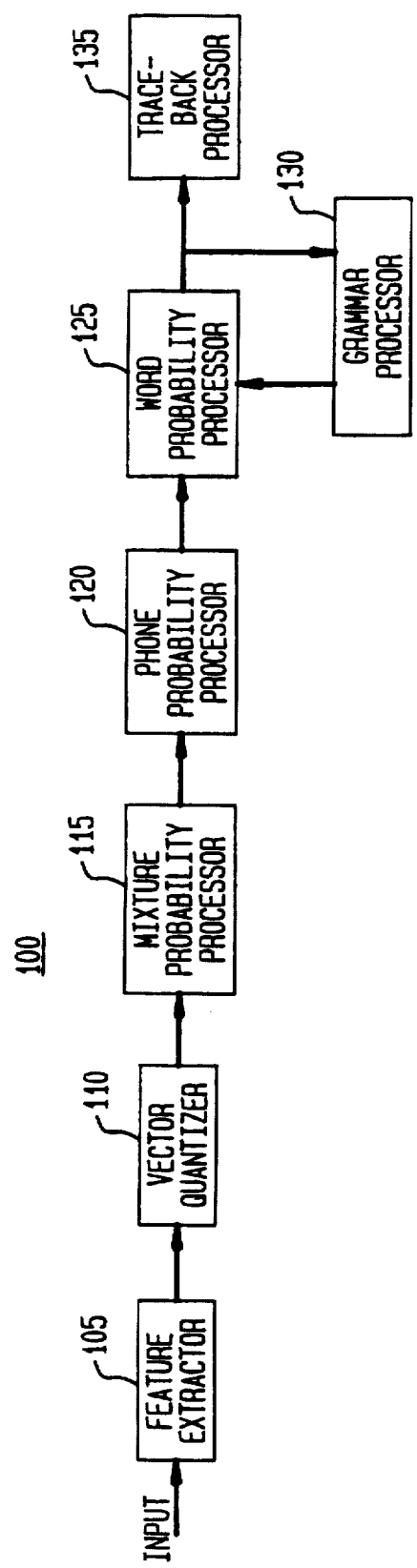
FIG. 1 is a block diagram of a speech recognition system embodying the principles of the present invention.

Attention is first directed to FIG. 1 which is a block diagram of a speech recognition system 100 embodying the principles of the invention. The recognition system 100 includes a number of functional blocks including, a linear-predictive-coding-(LPC)-based feature extractor 105, a vector quantizer 110, a mixture probability processor 115, a phone probability processor 120, a word probability processor 125, a grammar processor 130, and a traceback processor 135. The functionality of each block of the recognition system may be performed by a respective different processor, or the functionality of several or all blocks may be performed by the same processor. Furthermore, each stage can include multiple processing elements. The stages are pipelined and their operations are synchronized with the rate at which frames of the incoming speech signal are generated.

With the exception of the manner in which grammar processor 130 controls and interacts with word probability processor 125, the structure and operation of the system are conventional.

In particular, feature extractor 105 derives a set of LPC parameters from an incoming speech signal or speech input which defines the identifying characteristics of the speech input. The incoming speech signal is sampled in a sequence of overlapping frames during a corresponding sequence of frame periods. Feature extractor 105 thereupon produces so-called cepstral features from the LPC parameters which represent the frame being processed. Illustratively, 12 cepstral and 12 delta cepstral features are produced. Vector Quantizer (VQ) 110 is an optional stage which is included in the recognition system 100 to reduce computation requirements. Specifically, VQ 110 represents the various cepstral features in an efficient manner.

Signals containing the cepstral features for a particular incoming speech signal frame are transmitted from VQ 110 to mixture probability processor 115. Several mixtures are produced from the signals, those mixtures constituting a phone representation of the frame in question. A phone representation is a phonetic model of the speech signal frame. The mixture probability processor 115, in conventional fashion, computes the "mixture" components, or scores, which are then applied to phone probability processor 120. The latter generates feature scores—more particularly, phone scores—from the mixture component scores. Each of the phone scores indicates the probability that a respective phoneme was uttered during the speech signal frame period in question.

Word probability processor 125 contains a) prototypical word models—illustratively Hidden Markov Models (HMMs)—for the various words that the system of FIG. 1 is capable of recognizing, based on concatenations of phone representations. and b) data structures for instantiations of an HMM. In this context. the term "instantiation" of an HMM refers to the allocating of memory space within word probability processor 125 and the establishment of data structures within that space needed in order to process phone scores in accordance with the HMM in question. (A particular HMM requires a different instantiation for each different appearance of the word in question within the grammar.)

Figure 2:
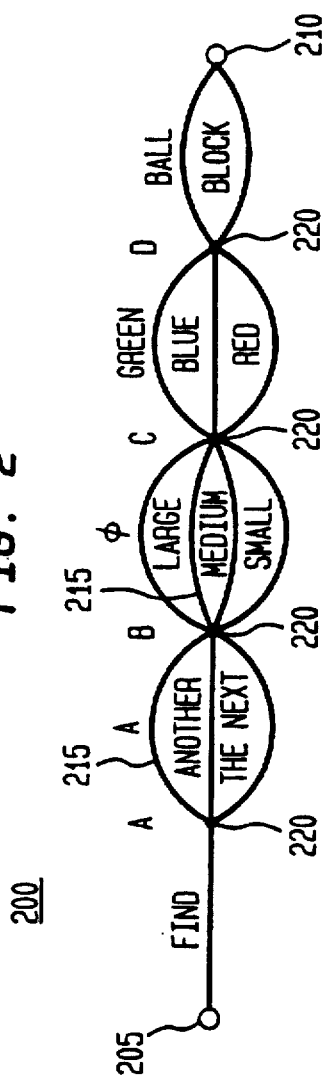
FIG. 2 is a grammar network representation of a grammar implemented by the system of FIG. 1.

Word probability scores generated by word probability processor 125 are received, and processed, by grammar processor 130 in accordance with the grammar under which the system operates. FIG. 2, in particular, shows a grammar network representation of that grammar. Specifically, the grammar network 200 includes start production node 205; nodes 220, individually labeled as A, B, C and D; end production node 210; and arcs 215. Each arc represents a particular word that the system is required to be able to recognize. Each different path proceeding from left to right through the grammar network is referred to as a "phrase path." Each phrase path defines a respective different (in this case) sentence that the system is designed to be able to recognize. Specifically, the phrase paths of the grammar in this simple example are commands that could be used to voice-control a robot.

More specifically, it can be seen from FIG. 2 that, in accordance with the limitations dictated by the structure of this particular grammar, the speaker is expected to always begin spoken commands by uttering the word "FIND." The speaker may then utter either of the words "A", or "ANOTHER" or the phrase "THE NEXT." Optionally, the command may now include a word denoting size, namely "large", "medium" or "small." The fact that a size-denoting word is optional results from the presence of the arc labeled φ, called a "null" arc. The grammar does require, however, that a color be uttered next followed by the name of an object. Thus, commands which are defined by this grammar, and thus are capable of being recognized by the system of FIG. 2 include, for example, "FIND A GREEN BLOCK" and "FIND THE NEXT LARGE BLUE BALL." However, the command "FIND A LARGE BLOCK" is not in the grammar because the grammar requires that a color must be included in each command. Moreover, the command "FIND A GREEN SMALL BALL" is not in the grammar because the size-denoting word must appear before the color-denoting word.

Figure 4:
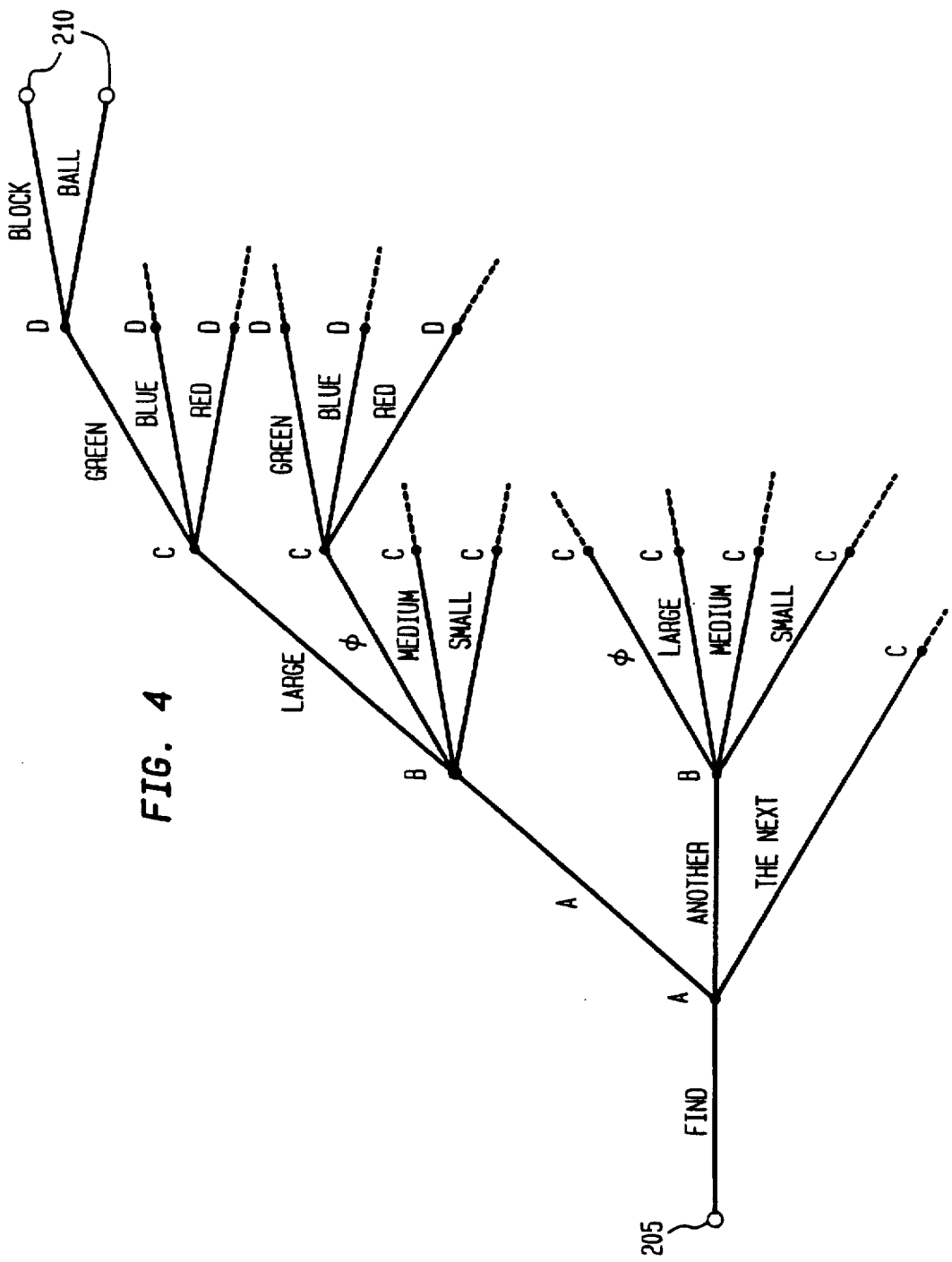
FIG. 4 is a tree structure illustrating an expanded representation of the grammar network of FIG. 2.

Another way of representing grammar network 200 is to expand it in such a way as to explicitly show each phrase path. This is illustrated in FIG. 4. Each phrase path comprises a serial concatenation of arcs as defined by the grammar of FIG. 2. For drawing simplicity, only two of the phrase paths are depicted in the FIG. in their entirety: "FIND A LARGE GREEN BALL" and "FIND A LARGE GREEN BLOCK". It can be readily verified that the 13 words and null arc contained in grammar 200 can be used to create 72 different phrase paths.

Although the speech recognition processing described herein is actually carried out by HMM instantiations of the various words defined in the grammar, it is convenient in the context of considering the grammar network representation of a grammar to think of the arcs that correspond to those words as carrying out the processing and, thus, being representative of the respective recognition—in this case, Hidden Markov—model. That viewpoint is used in the discussion which follows.

Specifically, for each input speech frame period, each arc of the grammar network provides an output referred to as an output hypothesis score. The output hypothesis score of an arc can be thought of as being applied to its right-hand, or "destination," node. Thus, for example, the output hypothesis scores of the arcs for GREEN, BLUE and RED can be thought of as being applied at node D. The values of the hypothesis scores that are output by each arc are updated for each input speech frame period based on two types of inputs. One of those types of input comprises phone scores that were generated by phone probability processor 120 in response to previous input speech frames. Those scores are applied to appropriate ones of the arcs in a well known way. The closer the "match" between the phone scores applied to a particular arc over a particular sequence of input frames, the larger the output hypothesis score of that arc. The other type of input for each arc for each input frame period is an input hypothesis score received from the left-hand, or "source" node of that arc. Thus, for each input frame period, each of the arcs for GREEN, BLUE and RED receive their input hypothesis score from node C. As among the multiple hypothesis scores that are applied to a node, it is the one that is the largest at any point in time that is taken as the input hypothesis score for the arcs that emanate from that node. That largest score is referred to as the cumulative hypothesis score for the node in question. Thus if at one point in time, the arc for MEDIUM is the one applying the largest output hypothesis score to node C, it is that particular score that is the cumulative hypothesis score for node C and is the score that is applied to each of the arcs for GREEN, BLUE and RED at that time. If at a subsequent time the arc for SMALL were to become the arc providing the largest hypothesis output score to node C, then THAT score would be the cumulative hypothesis score applied to each of the arcs for GREEN, BLUE and RED at that subsequent time. The input hypothesis scores for the arc for FIND, which can be thought of as being applied to start production node 205, are initially a good score hypothesis, e.g. 0, followed by a bad hypothesis score, e.g. −1000. This scoring arrangement acts as a trigger to indicate to the system that the beginning of a speech input is being received.

It may also be observed that the appearance of a cumulative hypothesis score at a particular node of the overall grammar network can be equivalently thought of as constituting the appearance of that score at the source node of each of the arcs that emanate from that particular node.

Figure 3:
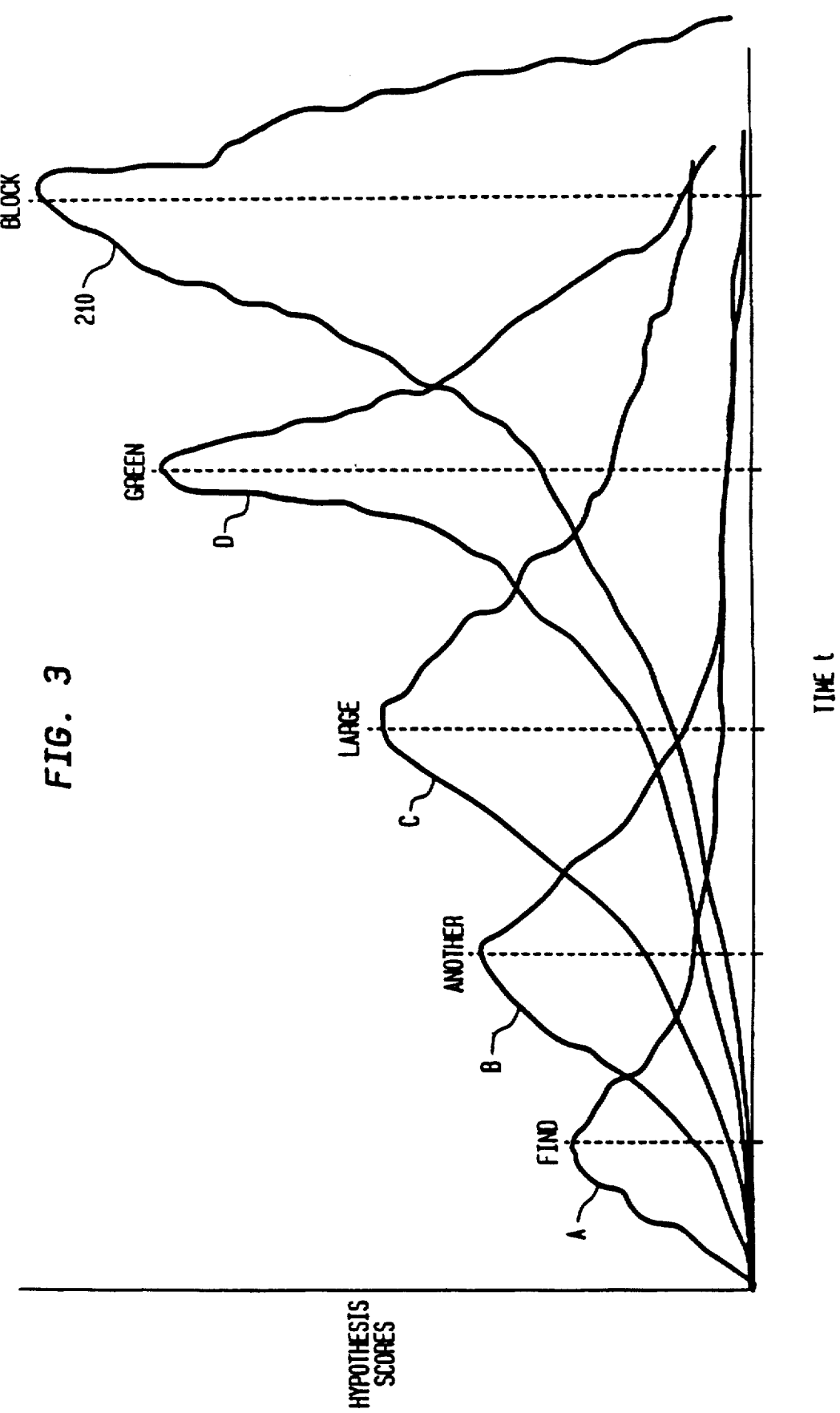
FIG. 3 is a graph depicting cumulative hypothesis scores appearing at various nodes of the grammar network of FIG. 2.

A qualitative description of how the speech processing proceeds will now be provided with reference to FIG. 2 and to FIG. 3, the latter being a conceptual plot of the cumulative hypothesis scores that appear at nodes A, B, C, D and 210 over successive input speech frame periods.

Assume, in particular, that the speaker has begun to utter the command "FIND ANOTHER LARGE GREEN BLOCK." The hypothesis score provided by the arc for FIND begins to increase as the speaker utters FIND. That score, applied to node A, then propagates into the arcs for "A", "ANOTHER" and "THE NEXT" and as the speaker begins to utter "A", "ANOTHER" or "THE NEXT", the hypothesis scores that are output by each of those three arcs, and applied to node B, will begin to increase. This increase in the output hypothesis scores for each of the three arcs "A", "ANOTHER" and "THE NEXT" is due, in part, simply to the propagation through each of those arcs of the hypothesis score that each of them received from node A. Moreover, in this case, since the speaker is in the process of uttering a command that is defined by the grammar, a command that begins with "FIND ANOTHER"—the output hypothesis score provided by a particular one of the arcs for "A," "ANOTHER" and "THE NEXT" will ultimately be larger than the other two because of the close match between the spoken phonemes and the HMM associated with that particular arc. Initially, the arc providing the largest output hypothesis score to node B may be other than the arc whose corresponding word is the one actually spoken. For example, although the speaker may have uttered the word "ANOTHER", the arc for "A" may have initially provided a larger output hypothesis score since the word "ANOTHER" begins with the same phoneme as the word "A". Ultimately, however, the arc corresponding to the word actually spoken should produce the largest cumulative hypothesis score at node B.

The cumulative hypothesis scores appearing at nodes C, D and 210 begin to increase during subsequent input frames as the later parts of the command "FIND ANOTHER LARGE GREEN BLOCK" are uttered. Moreover, as can be seen from FIG. 3, the maximum values of those scores get larger and larger for nodes that are further and further to the right within the grammar because the hypothesis score representing the phrase path that best matches the input utterance propagates from node to node through the grammar and gets augmented as further matches occur. Note also from FIG. 3 that after the hypothesis score at a particular node reaches its maximum value, it begins to decrease. This is because subsequently uttered phonemes, which continue to be applied to the various arcs (i.e., HMMs) do not provide a close match to any of the arcs corresponding to earlier parts of the grammar. For example, none of the words, or parts of the words "ANOTHER LARGE GREEN BLOCK" match phonemically to the word "FIND". Thus as "ANOTHER LARGE GREEN BLOCK" is spoken, and the phone scores resulting therefrom are applied to the arc for "FIND", the output hypothesis score of that arc—and thus the score at node A—will decrease.

The determination of which of the 72 possible commands is the one that was most likely uttered is made by traceback processor 135 (FIG. 1). This block generates a table listing the cumulative, i.e., largest, hypothesis score appearing at each of nodes A, B, C, D and 210 for each input frame period. It also keeps track of the arc which supplied that cumulative hypothesis score for each input frame period. This table, then, is a numeric version of the curves shown in FIG. 3 in which, for drawing clarity, the arc that generated the maximum cumulative hypothesis score for each input frame period is shown explicitly in the FIG. only for the maximum cumulative hypothesis score. Determining which command was most likely the one uttered is simply a matter of determining from the table, for each node, which arc supplied the overall largest hypothesis score. Traceback processor 135 supplies the results of this determination to, for example, further processing entities (not shown) that will ultimately control the robot.

To this point, the description of the system of FIG. 1 has described an approach that is well known in the prior art. Specifically, in the prior art, the grammar is fully instantiated within word probability processor 125 prior to the processing of any input speech. That is, word probability processor 125 includes all of the HMM instantiations for the words to be recognized. This approach, while perfectly adequate when the grammar is small and simple, has significant drawbacks in many practical applications.

In particular, the grammar represented by grammar network 200 is a predefined, finite-state grammar. It is predefined in that all of the interrelationships of the grammar are represented explicitly within word probability processor 125. It is a finite-state grammar in that the ways in which the words can be combined to produce valid commands is finite. Indeed, this is a very small grammar in that the number of valid commands is quite small. Again, a grammar having these characteristics can be readily implemented in just the manner described above.

In particular, many practical applications require the use of a very large grammar which, in turn, requires a commensurate amount of memory to instantiate it. Moreover, it is often desirable to define grammars used in speech recognition and other applications as so-called recursive transition networks. By this is meant that at least some of the arcs are not associated with an actual word—such arcs being referred to as "terminal arcs"—but rather are associated with a variable name which represents a sub-network. The variable is referred to as a "non-terminal" and the arc as a non-terminal arc.

Figure 5:
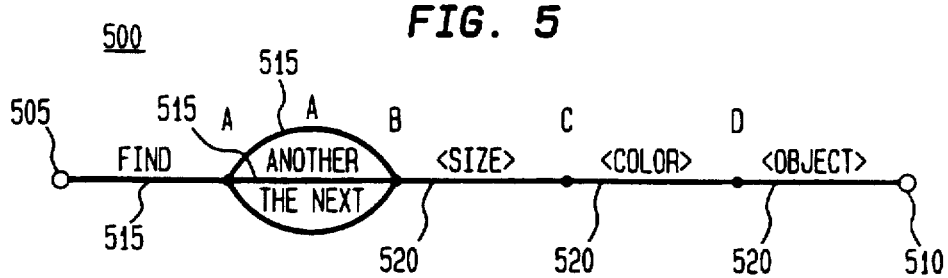
FIG. 5 is a recursive transition network representation of the grammar of FIG. 2.

FIG. 5, in particular, shows the network of FIG. 2 in the form of a recursive transition network. It includes start production 505, end production 510, and a plurality of arcs. In particular, arcs 515 for "FIND", "A", "ANOTHER", and "THE NEXT" are terminal arcs representing predefined word models. A null arc is also a kind of terminal arc. On the other hand, arcs 520 "size", "color" and "object" are non-terminal arcs associated with variable names indicated with <. . . >'s. Each such arc represents a predefined transition network—also referred to herein as a grammar sub-network.

Before the portion of a grammar which includes non-terminal arcs can be instantiated, those non-terminal arcs must be replaced by a transition network which includes only terminal arcs. Thus the non-terminal arc "color" would have to be replaced by the grammar sub-network that appears in the FIG. 2 representation as the three-parallel-arc portion of the network between nodes C and D. This is a matter of little moment when the overall grammar is as simple as the one shown herein. In more complex situations, however, the sub-network represented by a particular non-terminal arc may itself contain further non-terminal arcs which, in turn, are represented by sub-networks with further non-terminal arcs, and so forth. Indeed, the sub-network represented by a non-terminal arc may include itself. Disadvantageously, the cyclic and recursive nature of this situation allows for the possibility of very large—and possibly infinite-state—grammars which, at best, require a vast amount of memory to fully instantiate and, at worst, cannot be fully instantiated at all, given a finite amount of memory. For example, in the case where a leading non-terminal refers to a network in which it resides, the expansion process results in an infinite loop since all the non-terminal contained within the leading non-terminal cannot be fully expanded. This situation can be resolved by transforming the network to Greibach normal form which is well-known to those skilled in the art.

This situation has led to various compromise solutions in the prior art, including an arbitrary cut-off on the level of recursion to which the grammar is allowed to be expanded. Even if one were to find such a solution palatable from a speech recognition point of view, it does not deal with the fact that such large grammars require very large, and potentially unacceptable, amounts of processing and memory resources.

Figure 6:
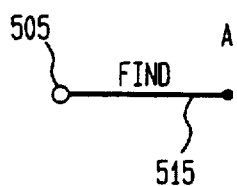
FIGS. 6–10 show how the grammar represented by the grammar network of FIG. 2 is evolved in response to speech input in accordance with the principles of the invention.
Figure 7:
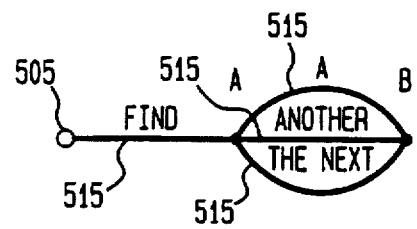
Figure 8:
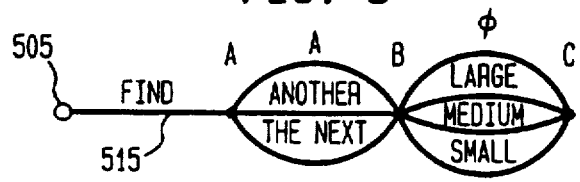

These and other problems are overcome in accordance with the present invention using what we refer to as an evolutional grammar. In particular, word probability processor 125, although containing models (viz., HMMs) for the words to be recognized, does not initially contain the instantiations of any of those models. Rather, as processing of the input speech begins, grammar processor 130 causes word probability processor 125 to instantiate only an initial portion of the grammar. such as represented in FIG. 6. Thereafter, as cumulative hypothesis scores rising above a predetermined turn-on threshold begin to appear at various nodes of the network, such as at nodes A and B in FIGS. 6 and 7, respectively additional portions of the grammar network are instantiated, as shown in FIGS. 7 and 8, the general idea being to always keep just a little bit "ahead" of what might be thought of as the "moving front" of cumulative hypothesis scores.

In preferred embodiments, the determination of whether to instantiate a new portion of the grammar is made for each input frame period using a value for the turn-on threshold, $S_{on}$, given by $$S_{on} = \alpha_{on} + \beta_{on} S_{max}$$

where $S_{max}$ is the maximum cumulative hypothesis score appearing at any of the grammar network nodes at that time, and $\alpha_{on}$ and $\beta_{on}$ are predetermined constants, which can be determined by experiment to yield a desired trade-off between recognition accuracy and resource usage. Illustratively, $\alpha_{on}=0$ and $\beta_{on}=0.99$. As a result of this approach, only those portions of the network that need to be instantiated will, in fact, be instantiated, this being a form of grammar "pruning" that may be referred to as "leading edge" pruning.

Specifically in the present, simple example, it turns out that the entirety of the grammar will ultimately have to be instantiated because the sub-networks represented by non-terminal arcs of FIG. 5 all include only terminal arcs. Thus there will be no leading-edge pruning. However, in more complex situations involving cyclic recursions, as discussed above, particular portions of the grammar will never be instantiated because the cumulative hypothesis scores appearing at nodes of the already-instantiated portion of the grammar will never exceed the turn-on threshold, meaning that there is insufficient likelihood that the spoken utterance will correspond to a phrase path that might include such additional portions to justify instantiating them. Thus, advantageously, the portion of the grammar that is instantiated in response to any particular input utterance will, in general, represent only a portion of the overall grammar. Moreover, as a further advantage, any level of cyclic recursion needed in order to properly recognize an utterance which is consistent with the grammar—albeit an utterance defined by a particular deep cyclic recursion of a portion of the grammar—can be supported without requiring vast memory resources or arbitrarily establishing a cut-off after an arbitrarily defined depth of recursion.

Alternatively stated, the system of FIG. 1, in response to the appearance of a hypothesis score exceeding the turn-on threshold at the source node of a non-terminal arc, recursively replaces that non-terminal arc with transition networks until all the arcs emanating from that node are terminal arcs and the HMMs for those arcs are thereupon instantiated.

Moreover, and in accordance with an important aspect of the invention, grammar processor 130 de-instantiates previously instantiated portions of the grammar when circumstances indicate that they are no longer needed, i.e., when it is reasonably clear that the portion of the grammar in question relates to inputs that have already been received and processed. This is a form of grammar "pruning" that may be referred to as "trailing edge" pruning. By de-instantiated we mean that, at a minimum, phone score processing and the propagation of hypothesis scores into such portions of the grammar, e.g., a particular HMM, are ceased, thereby preserving processing resources by allowing them to be dedicated to those portions of the grammar which are actually relevant to the speech currently being input. Moreover, in preferred embodiments, the de-instantiation includes the actual destruction of the unneeded portions of the grammar instantiation by releasing, back to the system, the resources—principally the memory resources—that were allocated to them, thereby freeing up memory resources for use in the instantiation of new portions of the grammar.

Figure 11:
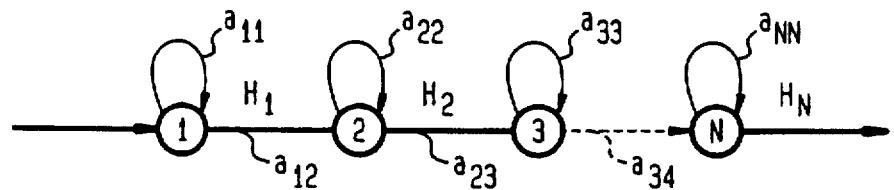
FIG. 11 shows a prototypical Hidden Markov Model state diagram presented to facilitate explanation of how an aspect of the system of FIG. 1 is implemented.

In preferred embodiments, de-instantiation of portions of the grammar is carried out on a model-by-model basis. Specifically, it is the case that a Hidden Markov Model typically generates one or more internal recognition parameters—specifically internal hypothesis scores—one of which is the output hypothesis score discussed above. Specifically, as shown in FIG. 11, an HMM is typically represented graphically by its so-called state transition diagram wherein each of the numbered circles represents a "state" and the parameters $a_{11}$, $a_{12}$, etc., represent state transition probabilities. At any point in time, HMM internal hypothesis scores $H_1$, $H_2$ ... $H_N$ are the output hypothesis scores of the various states, with $H_N$—the output hypothesis score of the $N^{th}$ state—being the output hypothesis score of the model as a whole, corresponding to the output hypothesis scores of the arcs of FIG. 2. as described hereinabove. As the input speech is processed, each of the internal hypothesis scores will, at some point, rise above a particular turn-off threshold due, if to no other reason, to the propagation of a cumulative hypothesis score applied to the source node of the model. Once all of the internal hypothesis scores, including $H_N$ simultaneously drop below that threshold, the HMM in question is destroyed. In preferred embodiments, the turn-off threshold, $S_{off}$ is given by $$S_{off} = \alpha_{off} + \beta_{off} S_{max}$$

where $S_{max}$ is as defined hereinabove and where $\alpha_{off}$ and $\beta_{off}$ are predetermined constants, which, like $\alpha_{one}$ and $\beta_{on}$ presented hereinabove can be determined by experiment to yield a desired trade-off between recognition accuracy and resource usage. Illustratively, $\alpha_{off}=0$ and $\beta_{off}=0.98$. Since the Hidden Markov Models are instantiated only as needed and are de-instantiated when no longer needed, we refer to them as ephemeral HMMs, or EHMMs.

Figure 9:
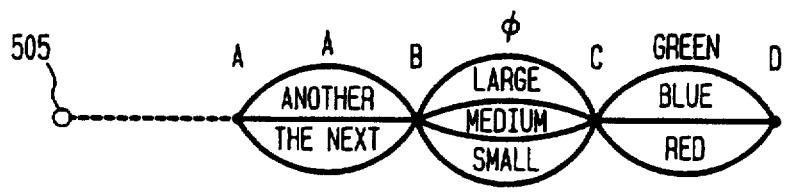
Figure 10:
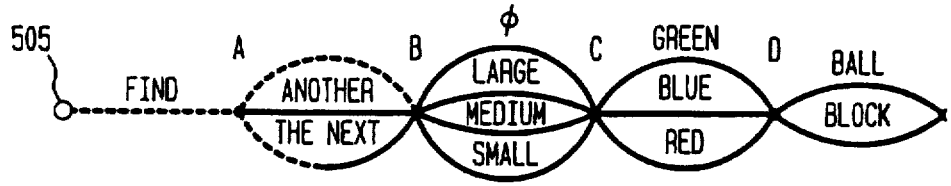

FIGS. 9 and 10 show the final stages of evolution of the grammar out to end production 510 and illustrate, by dashed lines, the fact that the EHMMs for "FIND, "A" and "THE" have, at various points in the processing, been destroyed. Depending on the tightness of the pruning, i.e., the values of $\alpha_{on}$, $\alpha_{off}$, $\beta_{on}$, and $\beta_{off}$, the destruction of EHMMs may be much more dramatic, meaning in this example, that the EHMMs for many more of the arcs will have been destroyed by the time that the <object> arc has been instantiated, as shown in FIG. 10.

Implementational Details

The above general description provides sufficient information for persons skilled in the art to practice the invention. For completeness, however, certain further implementational details for the system of FIG. 1 are now presented.

The LPC parameters derived by LPC feature extractor 105 specify a spectrum of an all-pole model which best matches the signal spectrum over the period of time in which the frame of speech samples are accumulated. Other parameters considered may include, but are not limited to, bandpass filtering, sampling rate, frame duration and autocorrelation. The LPC parameters are derived in a well known manner as described in C. Lee et. al., "Acoustic Modeling for Large Vocabulary Speech Recognition," Computer Speech and Language, pp. 127–165, April 1990. The LPC feature extractor 105 also produces cepstral features which represent the spectrum of the speech input. A cepstral is an inverse Fourier transform of the log of the Fourier transform of a function which represents a speech event. Any number of cepstral features can be used to represent the speech input. In the preferred embodiment, 12 cepstral and 12 delta cepstral features are produced.

As noted above, Vector Quantizer (VQ) 110 represents all possible cepstral features in an efficient manner. They are then stored in a codebook. In the preferred embodiment, the codebook is of size 256 or 512 and the resulting numbers of mixture components is typically 500 per frame. A vector quantizer of the type which could be included in the recognition system is described in E. Bocchieri, "Vector Quantization for the Efficient Computation of Continuous Density Likelihoods", Proc. IEEE Int'l. Conf. of Acoustics, Speech and Signal Processing, Vol. II, pp 684–687, 1993.

Figure 12:
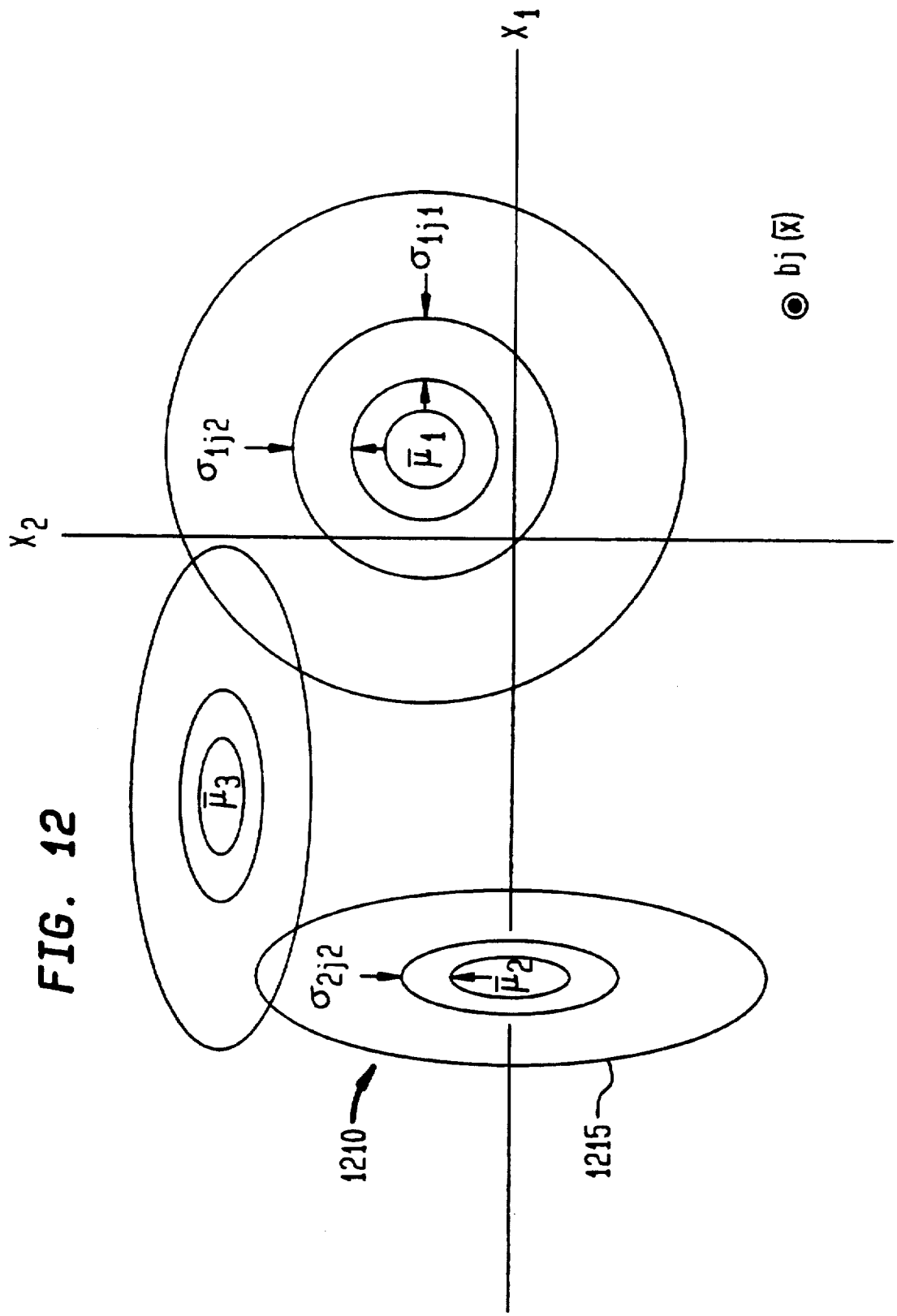
FIG. 12 shows mixture probabilities for mixtures processed by a mixture probability processor within the system of FIG. 1.

The mixture probability processor 115 computes the probability of each mixture component. Specifically, several mixtures of multivariate Gaussian distributions of the LPC parameters are used to represent the phone like units. An example of a distribution is shown in FIG. 12. As shown, the number of mixtures 1210 is 3 and each mixture has a dimension of 2. In a typical speech representation. more mixtures and dimensions are usually required. Each mixture is depicted as a concentric set of contours 1215, each of whose elevation out of the page represents the probability of observation of the particular feature. The elevation is typically highest at the center or mean of each distribution. Computations of probabilities associated with each mixture component are done as follows:

$$b_{mj}(\bar{x}) = (2\pi)^{D/2} |\Lambda_{mj}|^{-\frac{1}{2}} \exp(-(\frac{1}{2})(\bar{x}-\bar{u}_{mj})^T \Lambda_{mj}^{-1}(\bar{x}-\bar{u}_{mj})) \quad (1)$$

where b is the node log probability, M is the number of mixtures, D is the number of features, Λ is the diagonal covariance matrix, j is the state index, and m is the mixture component index. In the preferred embodiment, three state context independent phone representations are used, each state of which requires a 36 way mix of 24 dimensional Gaussian distributions.

Phone probability processor 120 generates triphone probabilities from the mixture component scores. A triphone is a mixture containing the context of a monophone of interest as well as the contexts of preceding and following monophones, phrase labels and mixture components. The triphones may be replaced with diphones and monophones if insufficient quantities of context-dependent samples are present. The probabilities of context dependent phones are computed by varying gains on the mixture components of the constituent monophones as follows:

$$b_j(\bar{x}) = \log \sum_{m=1}^{M} b_{mj} c_{mj} \quad (2)$$

where c is the mixture component weight. The log function enables word scoring to be calculated by addition versus multiplication, and limits the dynamic range of the partial word probabilities.

The word probability processor 125 computes word probability scores using triphone scores and initialization scores provided from grammar processor 130. For each frame, word probability processor 125 determines which triphone scores need to be computed for the next frame and transmits that information to phone probability processor 120.

Figure 13:
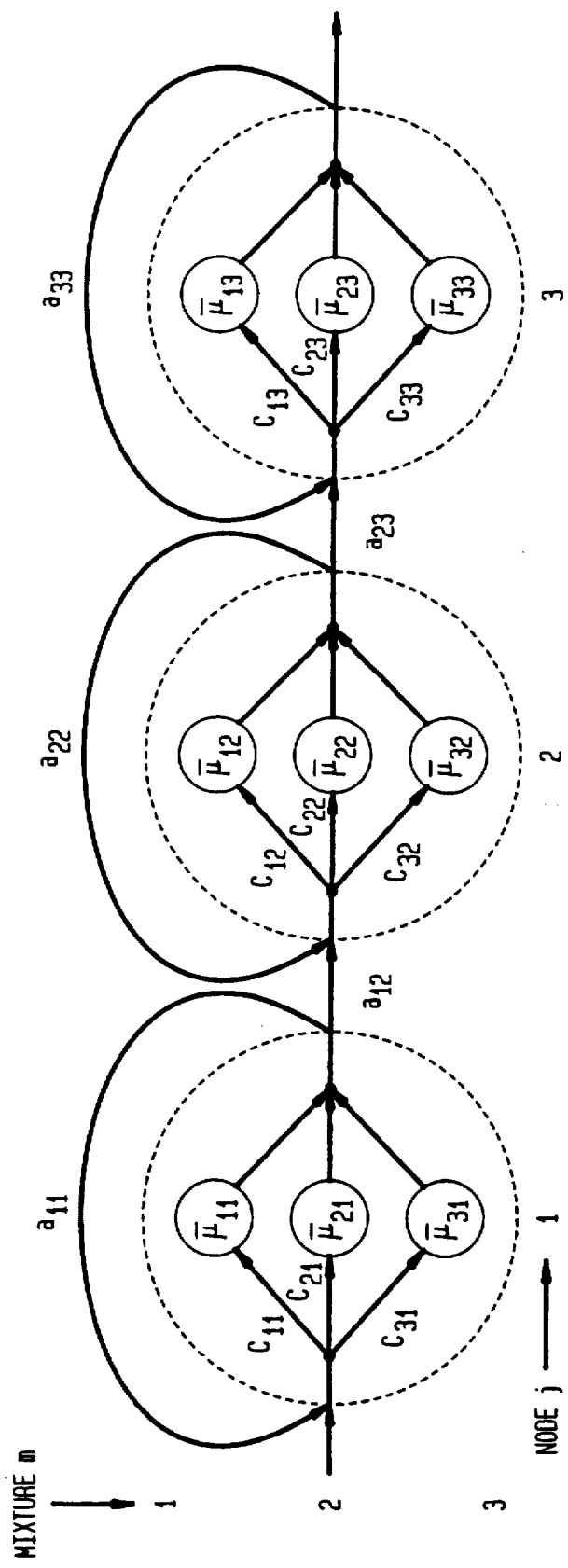
FIG. 13 illustrates a three state, three mixture Hidden Markov Model.

An example of a three state, three mixture HMM is illustrated in FIG. 13. The various articulations of the phone are captured by different traversals of the graph along inter-state and intra-state arcs. The transition probabilities are labeled "a" and the weights of the mixture elements are labeled "c". The best traversal of the graph to match an unknown phone is computed with dynamic programming as follows:

$$p_j = \operatorname*{Max}_{0 \le k \le 1} \{p_{j-k} + \log(a_{j-k,j})\} + b_j(\bar{x}) \quad (3)$$

The above equation is executed at each node j in reverse order, for each frame of the input signal in time order, to provide a final state probability score. The time spent in each state during the traversal can be recovered by accumulating the following quantity:

$$k_j = \operatorname*{argmax}_{0 \le k \le 1} \{p_{j-k} + \log(a_{j-k,j})\} \quad (4)$$

for each j and each test frame.

In grammar processor 130, non-terminal grammatical rules are used to dynamically generate finite-state subgrammars comprising word arcs and/or null arcs. Word arcs are arcs which are labeled by terminal symbols and null arcs are transition arcs which connect two or more word arcs. The grammatical rules may correspond to a null grammar, word N-tuple grammar, finite state grammar or context free grammar. Grammatical constraints are introduced by initializing the probability score of the first state of all word models with the probability score of the final state of all word models that can precede them in the given grammar. A table of grammar node scores is updated at each frame as described in detail hereinafter.

If a score satisfies an EHMM creation criterion, a request is sent to the word probability processor 125 to instantiate the corresponding word model. As noted above, an EHMM is instantiated when its input probability is sufficiently large to potentially be a valid candidate on a correct grammar network path for current speech input. Processing of the EHMM, i.e., the application of phone scores thereto and the updating of the EHMM states, proceeds until the highest probability. i.e., hypothesis score, in the EHMM falls below a useful level at which point the EHMM is destroyed. The word scoring process generates not only a word probability score, but also a word index, a word duration, and a pointer back to the previous node in the finite state grammar for each frame of speech and each node in the grammar.

Once the entire incoming speech signal has been analyzed, the traceback processor 135 performs a traceback of the tree of candidate strings created by the processor 125 and grammar processor 130 to determine the optimal string of recognized words. The optimal string is produced by chaining backwards along a two dimensional linked list formed by the candidate strings from the best terminal node to the start node.

As discussed above, the word probability processor 125 and the grammar processor 130 contain a plurality of tables which store the indices necessary for processing an evolutional grammar. In the preferred embodiment, the following tables are stored within either the word probability processor 125 or the grammar processor 130: a Non-Terminal table, an EHMM creation table, a Phonetic Lexicon table, a Score table, a Null Arc table, and an Active EHMM table.

A Non-terminal table contains compact definitions of all sub-grammars within the system. The Non-Terminal table contains a static array of context free grammar rules and contains linked lists of possible phrases. An EHMM creation table stores grammar arcs predefined with constant word indices. The EHMM creation table is keyed on arc source nodes from a finite-state grammar and used to implement the EHMMs. The EHMM creation table can be static when a finite state grammar is used.

A Phonetic Lexicon table stores a lexicon of phonetic word spellings for the vocabulary words which are keyed on the word index. The Phonetic Lexicon table is used to build an internal structure when instantiating an EHMM. The word indices from the EHMM Creation table are used to index the lexicon table to retrieve an internal structure of an EHMM.

A Score table is keyed on grammar nodes. The Score table initially only contains a grammar start node score. The start node score is used with a Null-Arc table to propagate the score to all null-arc successors from the start node. A Null Arc table contains null grammar arcs which are keyed on arc source nodes. Null-arcs in a grammar are arcs with no associated HMM and which as a result require no model processing. The null-arcs are used to make the grammar representation more efficient by sharing parts of the grammar, thereby avoiding duplication.

Once the start node is inserted into the Score table, the Score table is scanned to find all scores satisfying the EHMM creation criterion. For each satisfactory score, the associated score is looked up in the EHMM creation table and all EHMMs found there are created if they do not already exist An Active EHMM table maintains all instantiated EHMMs in a hash table and in linked list form. The hash table entries are linked in a single sequence for a fast sequential access needed to update the word models.

When an EHMM is designated for instantiation (creation), it must first be determined if the EHMM is already in existence. The hash table is used to quickly locate the EHMM if it is present. If the EHMM is not present, memory is allocated for the EHMM and inserted into the list and hash table. The above-described thresholds used for EHMM creation and destruction can be written formally as follows: We first define $S_{max}$ as $$S_{max} = \max_{n \in G_a}(S_n) \quad (5)$$

where n is a node in an active part of an evolutional grammar (EG) node set Ga; and s is a score. The dual thresholds are determined as follows:

$$S_{on} = \alpha_{on} + \beta_{on} S_{max} \quad (6)$$

$$S_{off} = \alpha_{off} + \beta_{off} S_{max} \quad (7)$$

where α and β are final parameters. The threshold constraints are used to instantiate and de-instantiate lower score word representations on the next speech frame. Other methods for selecting thresholds may be used such as, but not limited to, sorting by score.

The word indices may also be variable. The variables or non-terminals represent not only words, but entire grammars, each of which may contain additional variables. When one of the non-terminals is encountered in the EHMM Creation table, rather than creating an EHMM immediately, the non-terminal in the EHMM Creation table is first replaced with its value and accessed again. In this way, the grammar represented in the finite-state EHMM Creation table evolves into a potentially much larger grammar as EHMMs are created. The non-terminals are stored in the Non-Terminal table and are keyed on a non-terminal index number.

Each non-terminal represents a finite-state grammar having one start node and one end node. Upon expansion, a non-terminal arc is replaced by a set of grammar arcs from the original non-terminal's source node to the original non-terminal's destination node. Multiple terminal grammar nodes are converted to a single terminal grammar node by adding null-arcs, such that the entire grammar is stored in the non-terminal index.

Figure 14:
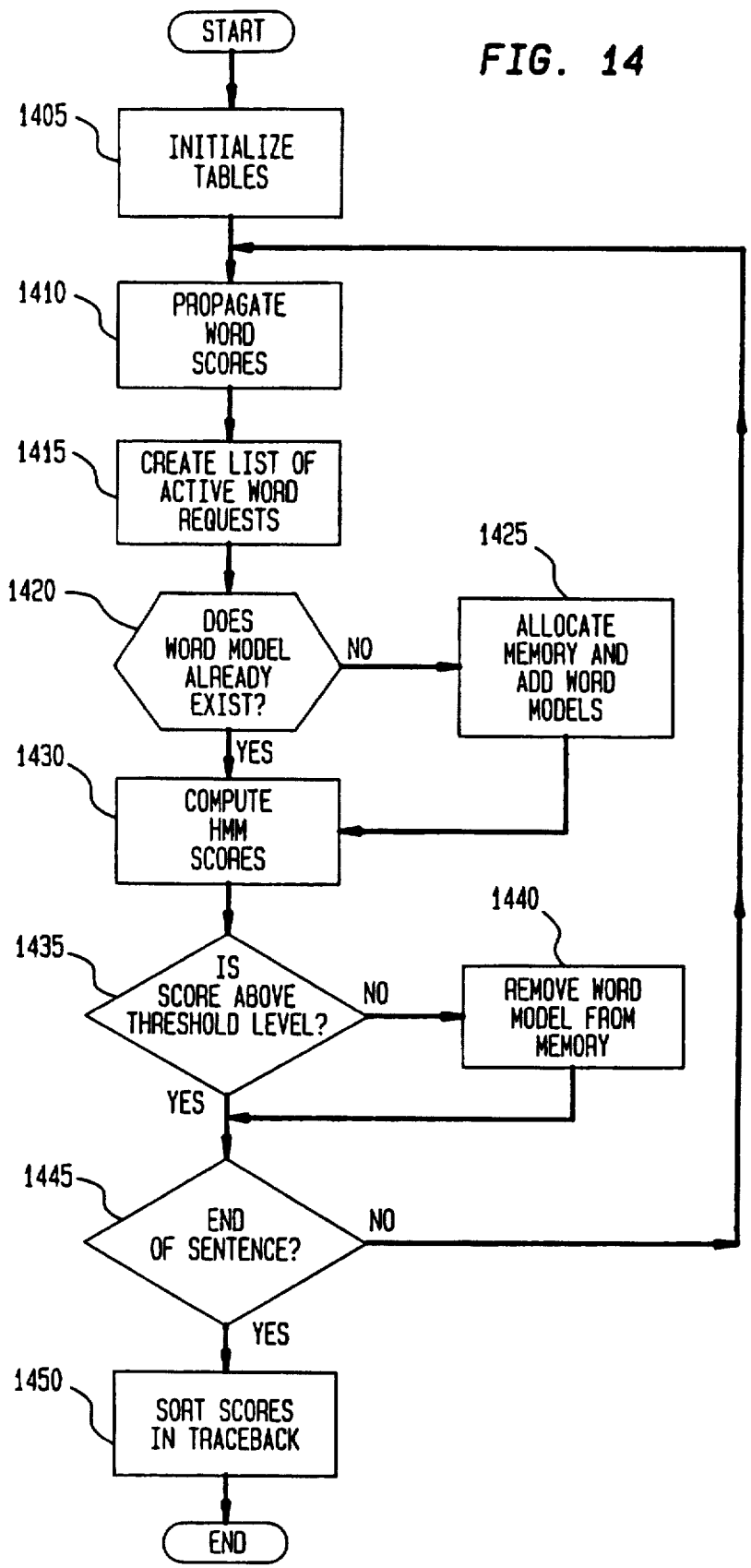
FIG. 14 is a flow chart depicting the operation of the system of FIG. 1.

FIG. 14 is a flow chart depicting the operation of the system of FIG. 1. In general, initially the speech recognition system starts with no EHMMs, i.e., no initial grammar. During an initialization procedure (step 1405), the Lexicon Phonetic table and Non-Terminal table are loaded into the grammar processor. The first non-terminal is inserted into the evolutional grammar table and null arc table. An initial input probability or score is applied to a grammar start state which is initially the only existing active state. The first score in the Score table is set to zero (a good score) and all other scores are set to a small value, e.g. −1000 (a bad score). This scoring arrangement acts as a trigger for indicating to the system that the beginning of a speech input is being received. Immediately, all EHMMs or word representations consistent with the threshold needed to represent all starting words in the grammar are created. Alternatively, the recognition system may sample the scores from the first speech frame only. If the scores are poor or below the threshold level, the EHMM is not activated.

Next a propagation phase (step 1410) is entered in which scores computed during the recognition process are propagated through the grammar processor. The grammar processor identifies scores which are above a predetermined threshold value and propagates these scores along the null arcs. During the propagation of these scores, any non-terminals which are encountered are expanded and entered into the terminal table. The non-terminals are further copied to the Evolutional Grammar table and Null Arc table and new node numbers are accordingly substituted.

As the scores for each word are updated, a list is created of active word requests (step 1415). The active words are determined by scanning the Score table for words with scores over the predetermined threshold. The words having good scores are transmitted as active word requests to the word probability processor for dynamic programming processing. The Word probability processor scans the list of active word requests and checks to see if the words are already active (step 1420). If the words are not active (step 1425), memory is allocated and the word model is added to the HMM tables.

Next, the HMM scores are computed (step 1430). As output scores begin to appear from the HMMs, additional successor HMMs in the grammar network are instantiated. While this process continues, earlier HMMs begin to decline in score value, ultimately being reduced to inconsequential levels at which point these HMMs vanish and the associated memory is released (step 1440). Next, it is determined whether the entire speech input has been analyzed, i.e., whether the end of the sentence has been reached (step 1445). If not, additional scores are propagated and the procedure repeats from step 1410.

When the end of the sentence is reached, traceback is performed (step 1450). Trace-back is performed by identifying the word branch having the highest score and chaining backwards through the HMM to the start terminal. These scores are then transmitted to the grammar processor.

The foregoing merely illustrates the principles of the invention and it will thus be appreciated that those skilled in the art will be able to devise numerous alternative arrangements which, although not explicitly described herein, embody the principles of the invention and are within the scope and spirit.

We claim:

1. A method for use in a grammar-based recognition system wherein the grammar is represented by a grammar network comprised of arcs interconnecting nodes, the arcs being representative of recognition models, each arc having a source node and a destination node, and in which feature scores are generated by a processor in the system and input to the grammar network and resulting cumulative hypothesis scores are propagated through the models to produce cumulative hypothesis scores at various ones of the nodes, the method comprising the step of:

allocating resources in the processor to implement a recognition model, currently absent from the grammar network, for an individual one of the arcs in response to the production, at its source node, of a cumulative hypothesis score meeting a predetermined criterion, the arcs including at least one terminal arc representative of a predefined recognition model and at least one non-terminal arc representative of a predefined grammar sub-network comprising a plurality of non-terminal arcs, the at least one terminal arc and the at least one non-terminal arc being arranged in a predetermined order in the grammar network.

2. The method of claim 1 comprising the further step of ceasing to propagate a hypothesis score through an individual one of said recognition models if cumulative hypothesis scores within said individual model satisfy a predetermined turn-off criterion.

3. The method of claim 2 wherein said turn-off criterion is that each of the cumulative hypothesis scores within said individual model fall below a predetermined turn-off threshold after having exceeded it.

4. The method of claim 3 comprising the further step of releasing memory used by said individual recognition model back to said system for use in later resource allocation to implement the recognition models for ones of said arcs other than said individual one of the arcs.

5. The method of claim 1 wherein each recognition model includes at least one Hidden Markov Model (HMM).

* * * * *